United States Patent
Wang

(10) Patent No.: US 11,118,010 B2
(45) Date of Patent: Sep. 14, 2021

(54) POLYCARBONATE, METHOD FOR PREPARING THEREOF, AND APPLICATION THEREOF

(71) Applicant: WUHAN CHINA STAR OPTOELECTRONICS SEMICONDUCTOR DISPLAY TECHNOLOGY CO., LTD., Hubei (CN)

(72) Inventor: Yamin Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 90 days.

(21) Appl. No.: 16/609,865

(22) PCT Filed: May 22, 2019

(86) PCT No.: PCT/CN2019/087958
§ 371 (c)(1),
(2) Date: Oct. 31, 2019

(87) PCT Pub. No.: WO2020/215424
PCT Pub. Date: Oct. 29, 2020

(65) Prior Publication Data
US 2020/0339747 A1  Oct. 29, 2020

(51) Int. Cl.
*C08G 64/42* (2006.01)
*C08G 18/32* (2006.01)
(Continued)

(52) U.S. Cl.
CPC .................. *C08G 64/42* (2013.01)

(58) Field of Classification Search
None
See application file for complete search history.

(56) References Cited

U.S. PATENT DOCUMENTS

| 2005/0219678 A1 | 10/2005 | Lenhard et al. |
| 2006/0200167 A1 | 9/2006 | Peterson et al. |
| 2006/0204756 A1 | 9/2006 | Welton et al. |

FOREIGN PATENT DOCUMENTS

| CN | 1938395 A | 3/2007 |
| CN | 102806172 A | 12/2012 |
| | (Continued) | |

OTHER PUBLICATIONS

Folmer et al., "Supramolecular Polymer Materials: Chain Extension of Telechelic Polymers Using a Reactive Hydrogen-Bonding Synthom," Advanced Materials, vol. 12. No. 12, pp. 874-878 (2000) (Year: 2000).*

*Primary Examiner* — Rachel Kahn
*Assistant Examiner* — Ha S Nguyen
(74) *Attorney, Agent, or Firm* — Mark M. Friedman

(57) ABSTRACT

A polycarbonate, a preparation method thereof, and an application thereof are provided. First, an ureido-pyrimidinone type diisocyanate is prepared by a first compound and a second compound. Then, a third compound and the ureido-pyrimidinone type diisocyanate are reacted to obtain a polycarbonate. The polycarbonate replaces scratch resistant metal material to avoid the disadvantages of the signal shielding, heavy weight, and static electricity when using the scratch resistant metal material in the winter. The body housing is made of polycarbonate can have a self-healing property and a good heat resistance, so the internal components can be well protected.

7 Claims, 2 Drawing Sheets step for preparing an ureido-pyrimidinone type diisocyanate — S1 step for preparing a polycarbonate — S2

(51) Int. Cl.
*C08G 18/80* (2006.01)
*C08G 18/28* (2006.01)
*C08G 18/42* (2006.01)
*C08G 18/48* (2006.01)
*C08G 18/71* (2006.01)
*C08G 18/44* (2006.01)
*C08G 64/12* (2006.01)

(56) References Cited

FOREIGN PATENT DOCUMENTS

| | | |
|---|---|---|
| CN | 105037701 A | 11/2015 |
| CN | 105860017 A | 8/2016 |
| WO | 2006095136 A1 | 9/2006 |

* cited by examiner

POLYCARBONATE, METHOD FOR PREPARING THEREOF, AND APPLICATION THEREOF

BACKGROUND OF INVENTION

Field of Invention

The present invention relates to a field of preparing self-healing materials, and more particularly, to a polycarbonate, a method for preparing thereof, and application thereof.

Description of Prior Art

Currently, mobile phone cases are inevitably damaged caused by external force when people use mobile phones, which shortens service life of the mobile phone cases. Because scratch resistant metal materials are used for mobile phone cases, the mobile phone cases have the disadvantages of the signal shielding, heavy weight, and static electricity when the mobile phones is operated in the winter. Therefore, most of current mobile phone case materials are alloys and plastics. However, alloys are often not the best choice because of their heavy weight. Thus, choosing plastics is the emerging direction in the future. But plastics are easy interfered from the external environment, such as poor heat resistance and scratches, which can cause huge waste of resources. Therefore, it is difficult to recycle the polycarbonate materials formed by cross-linking and not friendly to the environment and causes energy consumption.

When materials are subjected to an external mechanical force, the surface or the inside of the materials is easily damaged, and thus materials are cracked, which seriously affects mechanical properties and service life of the materials. In order to solve the problem that materials are prone to damage when the materials are used for mobile phone, a concept of self-healing has been introduced. As a new type of intelligent material, self-healing materials have important development prospects and application value in some important engineering and special fields.

Since supramolecular chemistry was introduced in 1987, various methods have been developed to achieve self-healing materials, which include hydrogen bond, metal-ligand coordination, π-π stacking, electrostatic interaction, host-guest interaction, and so on.

Currently, research is focused on the microcapsule self-healing materials coated with a healing agent. Although the self-healing materials have certain self-healing ability, they also have disadvantages. For example, each healing agent corresponding specific material body has only one healing ability. Furthermore, microcapsules have poor stability in the substrate and cannot be stably present in the substrate for a long time. When the materials are cracked, it cannot guarantee that the microcapsules are broken to release the healing agent every time. Self-healing materials based on hydrogen bond which has a reversible ability can heal target materials for many times at each place and the self-healing materials are easy modified. But the hydrogen bond has a low bond energy, and thus hydrogen bond polymer materials have poor performance. Therefore, it is necessary to find a polycarbonate to solve the above problems.

SUMMARY OF INVENTION

A polycarbonate, a preparation method thereof, and an application thereof are provided to compensate of current materials that are not self-healing.

In order to solve the problems, a polycarbonate is provided. The polycarbonate includes a chemical formula as follows:

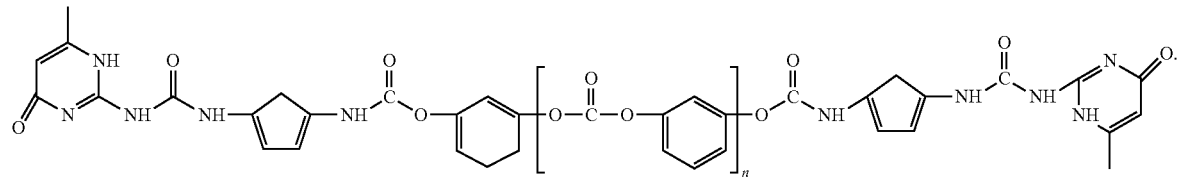

In one embodiment, the polycarbonate is prepared by a raw material, and the raw material includes ureido-pyrimidinone type diisocyanate and a third compound, and the third compound includes one of polycarbonate diol, polyethylene glycol, ethylene glycol, and polyester diol.

In one embodiment, the ureido-pyrimidinone type diisocyanate has a chemical formula as follows:

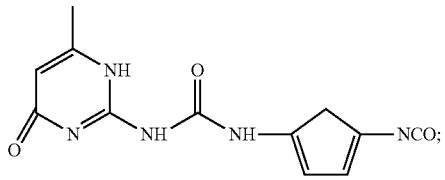

and the polycarbonate diol has a chemical formula as follows:

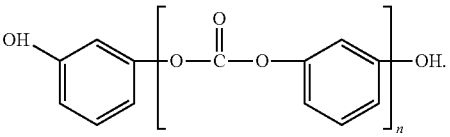

In one embodiment, a ratio of amounts of the ureido-pyrimidinone type diisocyanate to the third compound is 20-45 to 34-89.

In one embodiment, the ureido-pyrimidinone type diisocyanate is prepared by a raw material, and the raw material comprises a first compound and a second compound. The first compound includes one of pyrimidinone compounds and cytosine having an amino group. The second compound includes one of following chemical formulas:

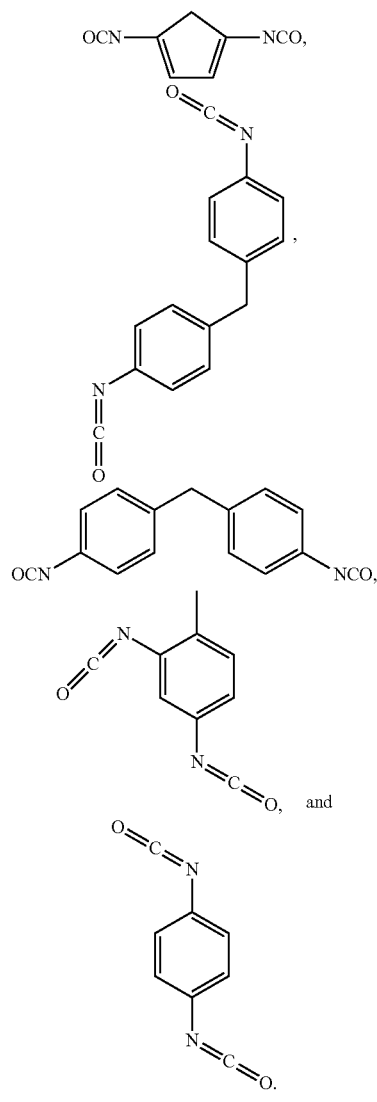

In one embodiment, the first compound is ureido pyrimidinone having a chemical formula as follows:

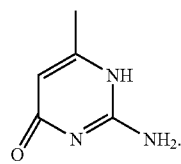

In one embodiment, the first compound is cytosine having an amino group, which has a chemical formula as follows:

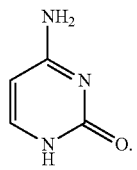

In one embodiment, a ratio of amounts of the first compound to the second compound is 60-160 to 400-1000.

In another embodiment, a method for preparing the polycarbonate includes following steps:

step S1, providing a first compound and a second compound, and the first compound and the second compound are refluxed at 90-110° C. for 2-20 hours under argon or nitrogen atmosphere and are cooled to room temperature, and an obtained precipitate is filtered with an alkane solution for 18-36 hours and dried for 2-3 days to obtain an ureido-pyrimidinone type diisocyanate; and step S2, providing a third compound, and the third compound and a dried ureido-pyrimidinone type diisocyanate prepared in the step S1 are refluxed at 90-110° C. for 2-20 hours under the argon or the nitrogen atmosphere and are cooled to room temperature, and an obtained precipitate is filtered with an alkane solution for 18-36 hours and dried for 2-3 days to obtain the polycarbonate.

The first compound includes one of pyrimidinone compounds and cytosine having an amino group. The second compound includes chemical formulas as follows:

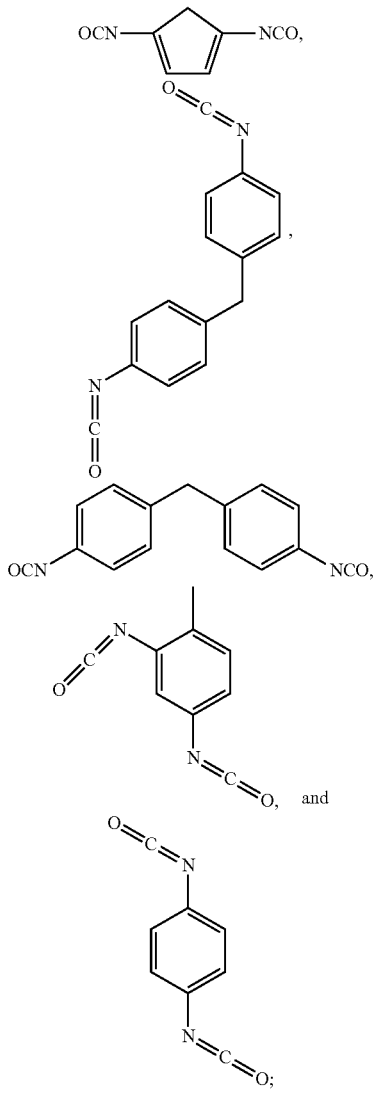

and the third compound includes one of polycarbonate diol, polyethylene glycol, ethylene glycol, and polyester diol.

In another embodiment, a body housing includes the polycarbonate.

A polycarbonate, a preparation method thereof, and an application thereof are provided. First, an ureido-pyrimidinone type diisocyanate is prepared by a first compound and a second compound. Then, a third compound and the ureido-pyrimidinone type diisocyanate are reacted to obtain a polycarbonate. The polycarbonate replaces scratch resistant metal material to avoid the disadvantages of the signal shielding, heavy weight, and static electricity when using the scratch resistant metal material in the winter. The body housing is made of polycarbonate can have a self-healing property and a good heat resistance, so the internal components can be well protected.

BRIEF DESCRIPTION OF DRAWINGS

In order to more clearly illustrate the technical solutions in the embodiments of the present invention, the drawings used in the description of the embodiments will be briefly described below. It is obvious that the drawings in the following description are only some embodiments of the present invention. Other drawings can also be obtained from those skilled persons in the art based on these drawings without paying any creative effort.

DETAILED DESCRIPTION OF PREFERRED EMBODIMENTS

Figure 1:
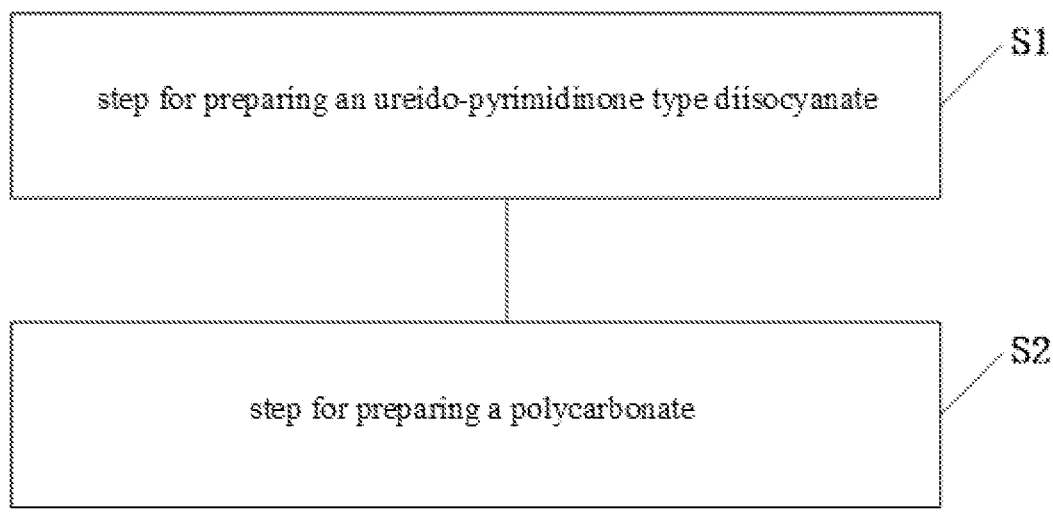
FIG. 1 is a step diagram showing a method for preparing a polycarbonate according to one embodiment of the present invention.

The preferred embodiments of the present invention are described in detail below with reference to the accompanying drawings. Those skilled persons in the art will easily understand how to implement the invention. The invention can be implemented by the embodiments, so that the technical content of the disclosure will be clear, so that those skilled persons in the art will understand how to implement the invention. The present invention may be accomplished in many different embodiments, and the scope of the invention is not limited to the embodiments described herein.

Directional terms mentioned in this application, such as "up," "down," "forward," "backward," "left," "right," "inside," "outside," "side," etc., are merely indicated the direction of the drawings. Therefore, the directional terms are used for illustrating and understanding of the application rather than limiting thereof.

In the drawings, identical components are marked with the same reference numerals, and structural or components having similar functions are marked with similar reference numerals. Moreover, the size and thickness of each component shown in the drawings are arbitrarily shown for understanding and describing, and the invention does not limit the size and thickness of each component.

When a component is described as "on" another component, the component can be disposed directly on the other component. Also, one component is disposed on an intermediate component, and the intermediate component is disposed on another component. When a component is described as "installed" or "connected" to another component, it can be understood as directly "installed" or "connected" to another component.

First Embodiment

A polycarbonate includes a chemical formula as follows:

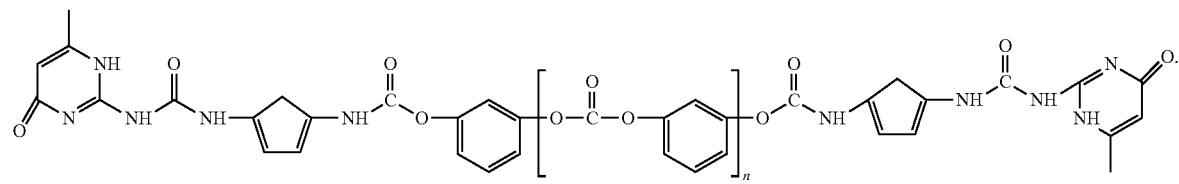

The polycarbonate is prepared by a raw material, and the raw material comprises ureido-pyrimidinone type diisocyanate and a third compound, and the third compound comprises one of polycarbonate diol, polyethylene glycol, ethylene glycol, and polyester diol.

The ureido-pyrimidinone type diisocyanate has a chemical formula as follows:

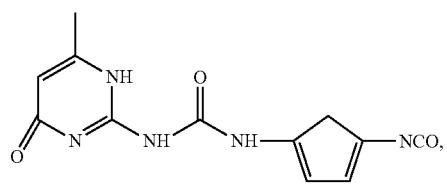

and the polycarbonate diol has a chemical formula as follows:

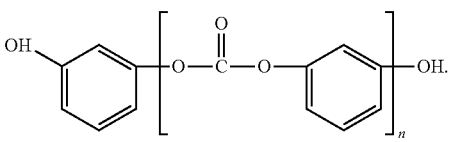

A ratio of amounts of the ureido-pyrimidinone type diisocyanate to the third compound is 20-45 to 34-89.

The ureido-pyrimidinone type diisocyanate is prepared by a raw material, and the raw material includes a first compound and a second compound, and the first compound includes one of pyrimidinone compounds and cytosine hav ing an amino group, and the second compound includes one of following chemical formulas:

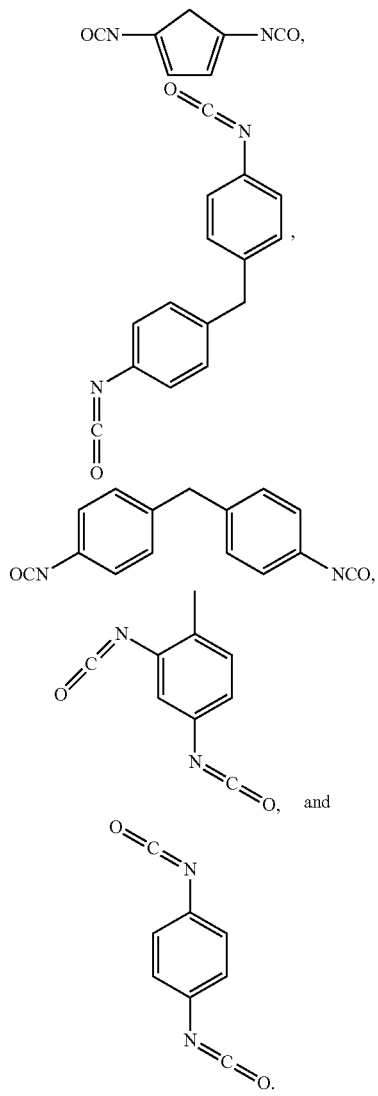

The first compound is ureido pyrimidinone having a chemical formula as follows:

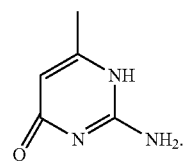

The first compound is cytosine having an amino group, which has a chemical formula as follows:

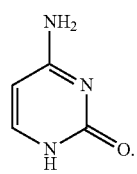

A ratio of amounts of the first compound to the second compound is 60-160 to 400-1000.

Accordingly, the polycarbonate has good heat resistance, and the body housing is made of the polycarbonate, so components disposed inside the body housing can be well protected.

Referring to FIG. 1, a method for preparing the polycarbonate includes following steps:

step S1, adding a first compound and a second compound to a three-necked flask, and the first compound and the second compound are refluxed at 90-110° C. for 2-20 hours under argon or nitrogen atmosphere and are cooled to room temperature, and an obtained precipitate is filtered with an alkane solution for 18-36 hours, and then a white power is dried for 2-3 days to obtain an ureido-pyrimidinone type diisocyanate; and step S2, adding a third compound and the ureido-pyrimidinone type diisocyanate prepared in the step S1 to the three-necked flask, and the third compound and a dried ureido-pyrimidinone type diisocyanate are refluxed at 90-110° C. for 2-20 hours under the argon or the nitrogen atmosphere and are cooled to room temperature, and an obtained precipitate is filtered with an alkane solution for 18-36 hours and then a white power is dried for 2-3 days to obtain the polycarbonate.

The first compound includes one of pyrimidinone compounds and cytosine having an amino group, and the second compound includes chemical formulas as follows:

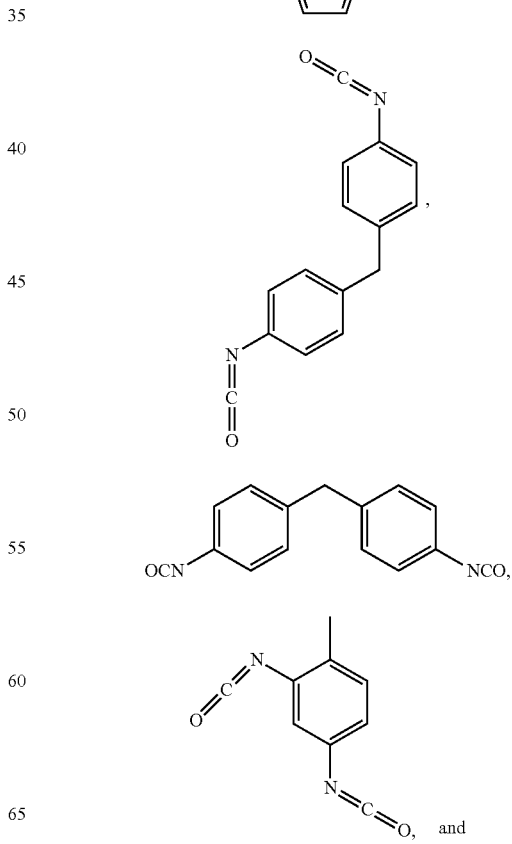

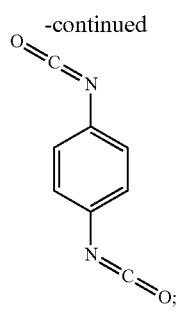

and the third compound includes one of polycarbonate diol, polyethylene glycol, ethylene glycol, and polyester diol.

The first compound is ureido pyrimidinone having a chemical formula as follows:

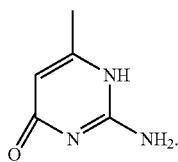

The second compound is diisocyanate including a chemical formula as follows:

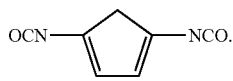

The third compound is a polycarbonate diol, and its chemical structural formula is as follows:

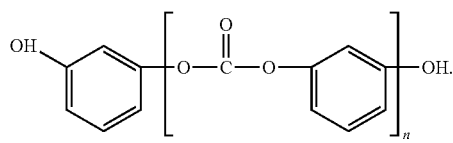

In the step S1, a ratio of amounts of the first compound to the second compound is 60-160 to 400-1000.

In the step S2, a ratio of amounts of the ureido-pyrimidinone type diisocyanate to the third compound is 20-45 to 34-89.

The alkane solution includes a mixture solution of n-hexane and tert-butanol in a volume ratio of 95:5 and another mixture solution of n-heptane and tert-butanol in a volume ratio of 95:5. Therefore, a self-healing material is used to avoid the disadvantages of signal shielding, heavy weight, and static electricity when using the scratch resistant metal material in the winter.

In another embodiment, a body housing includes the polycarbonate.

Figure 2:
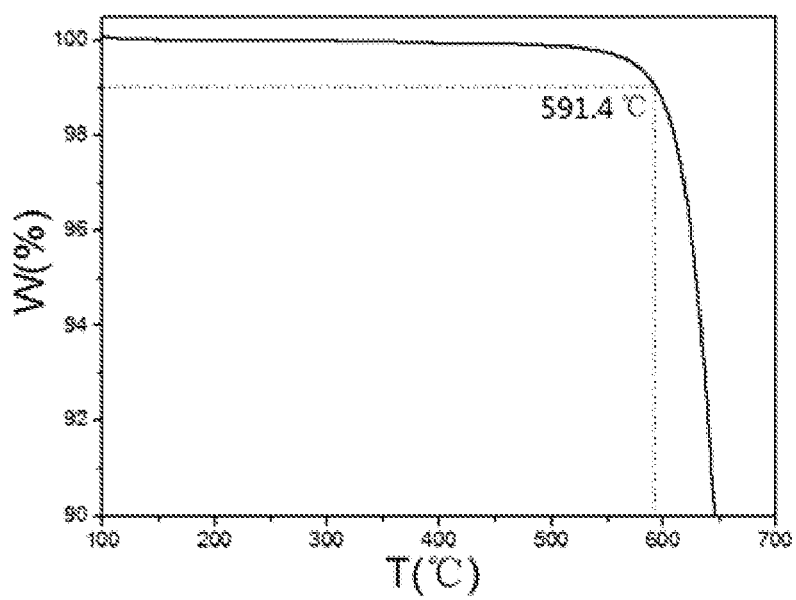
FIG. 2 is a thermogravimetric analysis (TGA) diagram of the polycarbonate according to one embodiment the present invention.

Referring to FIG. 2, the mobile phone case made of the polycarbonate according one embodiment of the present invention has good heat resistance at nearly 600° C., thereby the internal components of the mobile phone are well protected.

Figure 3:
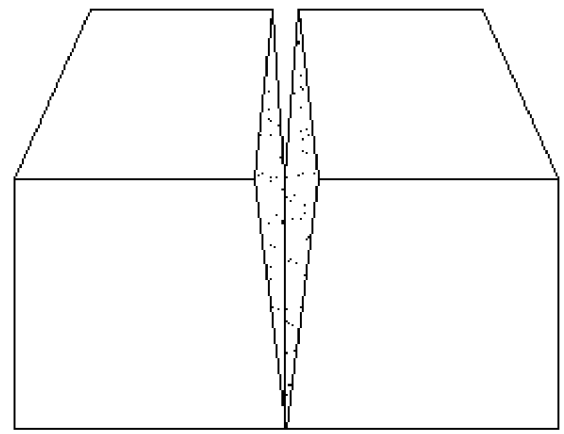
FIG. 3 is a schematic view of the polycarbonate according one embodiment of the present invention being scratched before healing.
Figure 4:
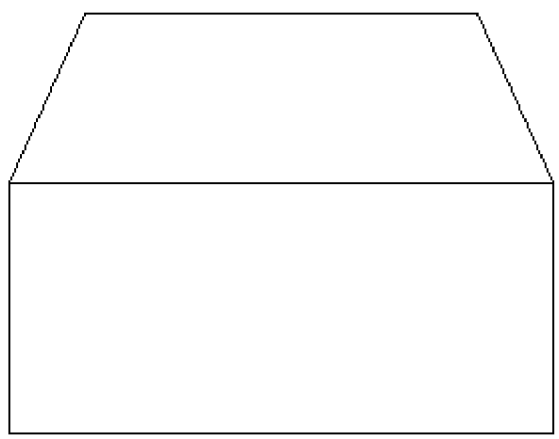
FIG. 4 is a schematic view of the polycarbonate according one embodiment of the present invention being scratched after healing.

Referring to FIG. 3 and FIG. 4, the polycarbonate has a good self-healing function and can be used for making a body housing, especially as a mobile phone case. Therefore, the internal components of the mobile phone can be well protected and the service life of the mobile phone is extended.

In the above, the polycarbonate provided by the embodiments of the present invention, the preparation method thereof and the application thereof are described in detail above. The present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A polycarbonate, comprising a following chemical formula:

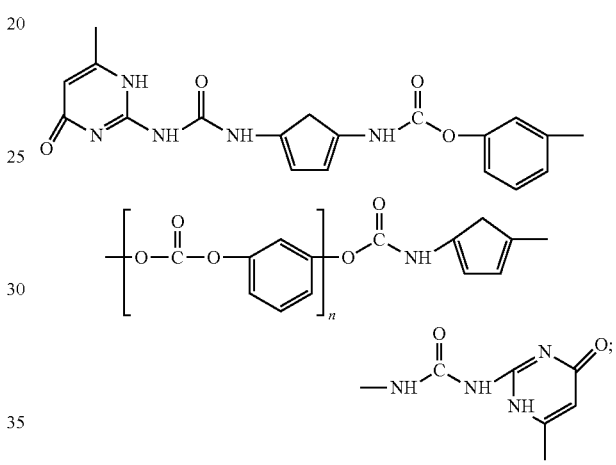

wherein n is a number greater than 1.

2. The polycarbonate according to claim 1, wherein the polycarbonate is prepared by ureido-pyrimidinone type isocyanate and polycarbonate diol.

3. The polycarbonate according to claim 2, wherein the ureido-pyrimidinone type isocyanate has a following chemical formula:

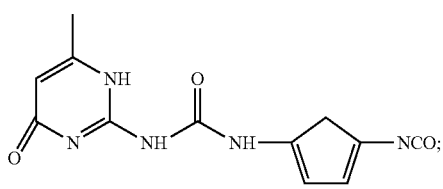

and the polycarbonate diol has a following chemical formula:

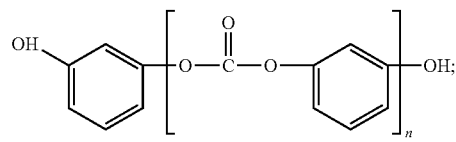

wherein n is a number greater than 0.

4. The polycarbonate according to claim 2, wherein the ureido-pyrimidinone type isocyanate is prepared by a first compound and a second compound;
  wherein the first compound comprises pyrimidinone compounds; and
  wherein the second compound comprises a following chemical formula:

5. The polycarbonate according to claim 4, wherein the first compound is ureido pyrimidinone having a following chemical formula:

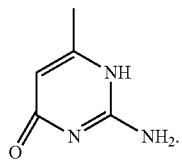

6. A method for preparing the polycarbonate of claim 1, comprising following steps:
  step S1, providing a first compound and a second compound, wherein the first compound and the second compound are refluxed at 90-110° C. for 2-20 hours under argon or nitrogen atmosphere and are cooled to room temperature to obtain a first precipitate, and the first precipitate is filtered with an alkane solution for 18-36 hours and dried for 2-3 days to obtain an ureido-pyrimidinone type isocyanate; and
  step S2, providing a third compound, wherein the third compound and the ureido-pyrimidinone type isocyanate prepared in the step S1 are refluxed at 90-110° C. for 2-20 hours under the argon or nitrogen atmosphere and are cooled to room temperature to obtain a second precipitate, and the second precipitate is filtered with the alkane solution for 18-36 hours and dried for 2-3 days to obtain the polycarbonate; and
  wherein the first compound comprises pyrimidinone compounds;
  wherein the second compound comprises a following chemical formula:

and
  wherein the third compound comprises polycarbonate diol.

7. A body housing comprising the polycarbonate of claim 1.

* * * * *